June 23, 1925.

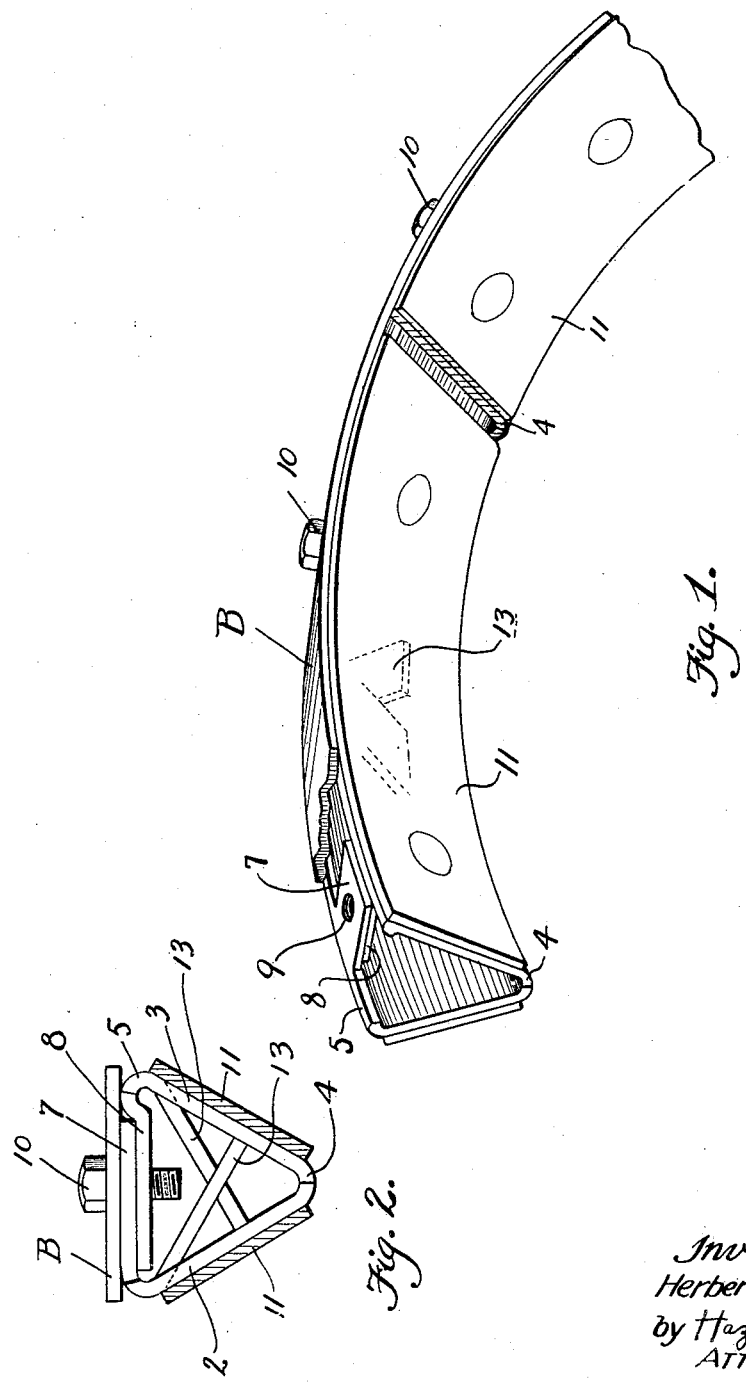

H. A. WALKER

BRAKE BAND STRUCTURE

Filed Nov. 24, 1922

Inventor,
Herbert A. Walker
by Hazard and Miller
ATTORNEYS

Patented June 23, 1925.

1,543,536

UNITED STATES PATENT OFFICE.

HERBERT A. WALKER, OF FULLERTON, CALIFORNIA, ASSIGNOR TO FREDERICK W. SMITH, OF WHITTIER, CALIFORNIA.

BRAKE-BAND STRUCTURE.

Application filed November 24, 1922. Serial No. 603,008.

*To all whom it may concern:*

Be it known that I, HERBERT A. WALKER, a citizen of the United States, residing at Fullerton, in the county of Orange and State of California, have invented new and useful Improvements in Brake-Band Structures, of which the following is a specification.

The present invention relates to brake structures for vehicle wheels, and more particularly for motor driven vehicles, and it is an object of the present invention to provide a simple, practicable, substantial and inexpensive form of brake band. It is another object of the invention to provide a brake band having a substantial backbone device and to which may be readily secured and removed brake band lining sections. It is another object to provide a brake band structure consisting of a number of brake band shoes of built up construction, and it is essentially an object to provide a shoe structure adapted to be readily attached to the usual contractive brake band as commonly in use with and provided for motor driven vehicle wheels.

It is particularly an object to provide means that may be readily substituted for the usual effective braking straps or linings, and which may be combined with the standard equipment brake band of motor vehicles.

Other objects and advantages will be made manifest in the following specification of embodiments of the invention illustrated in the accompanying drawings, wherein—

Figure 1 is a perspective showing a portion of the usual brake band of a conventional form and to which is applied the improved braking device.

Fig. 2 is a cross section through the device.

Figures 3, 4:
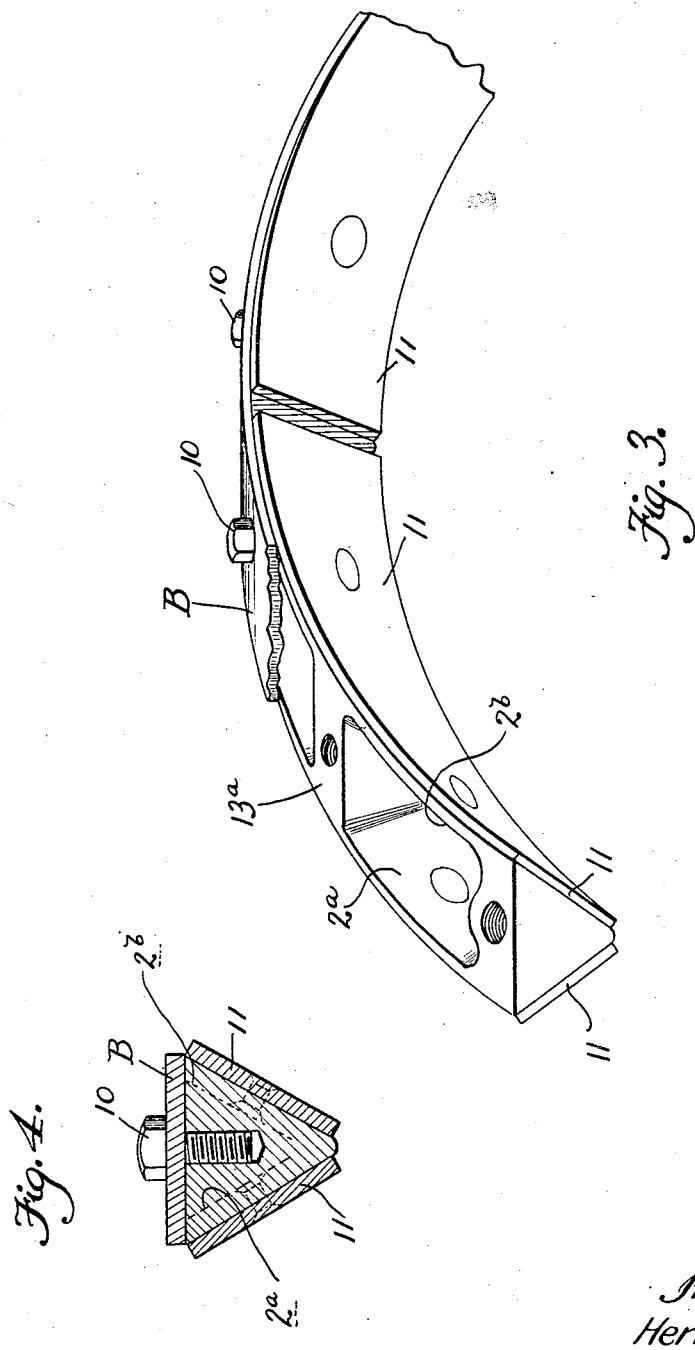
Fig. 3 is a perspective of a modified form of the backbone of the shoe.
Fig. 4 is a cross section of the form of device shown in Fig. 3.

A feature of my invention is means forming a built-up brake shoe which is adapted to be readily secured to a given size and type of contractive brake band B, which obviously varies with different types of vehicle wheels with which they are combined. By my invention I utilize the standard bands of wheels and apply thereto contractive braking shoes, preferably consisting of a plurality of sections.

In Figs. 1 and 2, the improved brake shoe is shown as consisting of divergently arranged backbone plates 2 and 3, the inner convergent ends of which may be provided with abutting shoulders 4 at the apex of the angle. These backbone plates are provided at divergent edges with inturned beads or reinforcing shoulders 5 to stiffen the parts. Preferably, the backbone plates 3 are made of arcuate form in plan or elevation and the curvature of the same conforms to the curvature of the brake band B to which they are to be internally applied.

The opposed backbone plates 2 and 3 may be rigidly secured in various manners, and as here shown each is provided with a pair of transversely extending tongues. To obtain simplicity and economical form of construction, the several plates are made interchangeable and reversible and all similar, and it is only necessary to reverse a pair of these plates and set them in opposition as shown in Fig. 2 to obtain a section of a shoe which is clearly shown in Fig. 1. The transversely extending tongues of each plate are slightly offset so that the tongue as 7 on one end of the plate is adapted to overlap the contiguous tongue 8 of the opposite plate when the plates are turned into assembled position. The tongues 7 and 8 are perforated at 9, Fig. 1, to receive a fastening screw 10 passed through the surrounding brake band B.

Upon the convergent outer faces of the backbone plates 2 and 3 of each shoe section, there is applied suitable lining sheets 11 to take the wear and provide the desired frictional means for acting in the usual braking function. If desired, the plates 2 and 3 may be provided with punched-in bar portions 13 which, when the plates are assembled will stand substantially perpendicular to the opposite plate, as clearly shown in Fig. 2, and when bearing against the same form a strut or brace for the same.

A slightly modified form of the invention is shown in Figs. 3 and 4 in which the backbone of the shoe is preferably cast in one complete rigid section, a suitable number of the desired length of each being secured to the brake band B. In this embodiment the backbone is in the form of a casting having the divergent walls 2ª and 2ᵇ, and these are transversely connected by webs or bars 13ª to secure strength and also to form means to receive the fastening screws 10. The sections of brake linings 11 are suitably fastened to the convergent faces of the rigid backbone section.

Further embodiments, modifications and changes may be resorted to within the spirit of the invention as here claimed.

What is claimed is:

1. In a brake structure, a brake lining section which is inherently of the form of a segment of a frusto-conoidal body; whereby to conform accurately with the concavo-conical face of a segmental shoe for a brake drum.

2. In a brake of the contractive type, a series of spaced segmental shoes having concavo-conical faces to be contracted in a grooved drum, and means for expanding and contracting the shoes and holding them in peripheral relation.

3. A contractive brake band structure comprising a backbone device having divergent outer faces to which sections of brake lining material are applied, said backbone device being formed of divergent side walls, and transversely extending bracing means for the side walls, said bracing means being adapted to receive screws which fasten the backbone device to a brake band.

4. A contractive brake band structure comprising a back bone device having divergent side walls, there being punched-in bar portions, the bar portions of one side wall engaging the opposite side wall to form braces between the walls.

5. A brake shoe structure comprising a segment having inwardly convergent side plates, means for connecting said plates in assembled relation, and brake linings fastened to the convergent faces of the plates, each plate having transverse tongues adapted to be overlapped in assembled relation and through which the fastening means pass.

6. A brake shoe structure comprising a segment having inwardly convergent side plates, means for connecting said plates in assembled relation, and brake linings fastened to the convergent faces of the plates, each plate having transverse tongues adapted to be overlapped in assembled relation and through which the fastening means pass, the inner ends of the converging plates being abutted.

7. A brake shoe structure comprising a segment having inwardly convergent side plates, means for connecting said side plates in assembled relation, each plate having transverse tongues adapted to be overlapped in assembled relation and through which the fastening means pass.

8. In a brake of the contractive type, a series of segmental shoes of V-section and having integral, transverse braces for the sides of the respective shoes, a band encompassing the shoes, and means fastening the shoes to the band to prevent lateral and peripheral slipping of the band as to the shoes and for expanding the shoes with the opening band.

In testimony whereof I have signed my name to this specification.

HERBERT A. WALKER.